(12) United States Patent
Hama et al.

(10) Patent No.: US 7,783,187 B2
(45) Date of Patent: Aug. 24, 2010

(54) ILLUMINATION CONTROLLER, ILLUMINATION CONTROL METHOD, AND IMAGING APPARATUS

(75) Inventors: Soichi Hama, Kawasaki (JP); Yutaka Katsumata, Inagi (JP); Morito Shiohara, Kawasaki (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 12/430,498

(22) Filed: Apr. 27, 2009

(65) Prior Publication Data

US 2009/0202236 A1    Aug. 13, 2009

Related U.S. Application Data

(63) Continuation of application No. PCT/JP2007/056969, filed on Mar. 29, 2007.

(30) Foreign Application Priority Data

Nov. 14, 2006    (JP) .............................. 2006-308095

(51) Int. Cl.
G03B 15/03    (2006.01)
(52) U.S. Cl. .............................. 396/155; 362/11; 396/4; 348/370
(58) Field of Classification Search ............. 362/11–12; 348/370; 396/4, 155, 164, 225; 359/591–598
See application file for complete search history.

(56) References Cited

U.S. PATENT DOCUMENTS

| | | | | |
|---|---|---|---|---|
| 936,707 | A * | 10/1909 | Farrand | 396/4 |
| 3,039,357 | A * | 6/1962 | Eagle | 396/3 |
| 4,997,263 | A * | 3/1991 | Cohen et al. | 349/11 |
| 5,132,828 | A * | 7/1992 | Conner et al. | 398/158 |
| 5,631,976 | A | 5/1997 | Bolle et al. | |
| 5,748,237 | A | 5/1998 | Ueda et al. | |
| 6,906,693 | B1 * | 6/2005 | Miyashita | 345/102 |
| 7,510,228 | B2 * | 3/2009 | Ito et al. | 296/65.17 |
| 7,667,766 | B2 * | 2/2010 | Lee et al. | 348/370 |
| 2004/0046739 | A1 * | 3/2004 | Gettemy | 345/158 |

FOREIGN PATENT DOCUMENTS

| | | |
|---|---|---|
| JP | 7-019823 A | 1/1995 |
| JP | 7-095451 A | 4/1995 |

(Continued)

OTHER PUBLICATIONS

International Search Report of PCT/JP2007/056969, Mailing Date of Jul. 3, 2007.

*Primary Examiner*—W. B. Perkey
*Assistant Examiner*—Leon W Rhodes
(74) *Attorney, Agent, or Firm*—Westerman, Hattori, Daniels & Adrian, LLP

(57) ABSTRACT

An illumination controller for controlling an illumination device that irradiates an object to be photographed with illumination light. The illumination controller includes an introducing unit that introduces ambient light emitted to the object from a light source other than the illumination device; a processing unit that processes the ambient light introduced by the introducing unit to have a same characteristic as that of the illumination light; and an irradiation controlling unit that controls the ambient light processed by the processing unit so as to irradiate the object therewith as illumination, from a same path as the irradiation path of the illumination light.

20 Claims, 13 Drawing Sheets

FOREIGN PATENT DOCUMENTS

| | | |
|---|---|---|
| JP | 7-177398 A | 7/1995 |
| JP | 7-199848 A | 8/1995 |
| JP | 7-248492 A | 9/1995 |
| JP | 7-302339 A | 11/1995 |
| JP | 9-305765 A | 11/1997 |
| JP | 9-327024 A | 12/1997 |
| JP | 2000-241800 A | 9/2000 |
| JP | 2005-277629 A | 10/2005 |

* cited by examiner

FIG.5

| (1) | $R = 3.5064X - 1.7400Y - 0.5441Z$<br>$G = -1.0690X + 1.9777Y + 0.0352Z$<br>$B = 0.0563X - 0.1970Y + 1.0511Z$ |
|---|---|
| (2) | $R = 1.2223X$<br>$G = 0.9439X$<br>$B = 0.9104X$ |
| (3) | $R:G:B \approx 4:3:3$ |

FIG.6

| (1) | $I\_min = min(I\_A'/K\_A, I\_B'/K\_B, I\_C'/K\_C)$ |
|---|---|
| (2) | $C\_A = I\_min \times K\_A / I\_A'$<br>$C\_B = I\_min \times K\_B / I\_B'$<br>$C\_C = I\_min \times K\_C / I\_C'$ |
| (3) | $I\_total = I\_min \times (K\_A + K\_B + K\_C)$ |

· $I\_A', I\_B', I\_C' \rightarrow$
  VOLTAGE VALUES CORRESPONDING TO PD CURRENT VALUES · $K\_A, K\_B, K\_C \rightarrow$
  CONSTANT OF LIGHT AMOUNT RATIO · $C\_A, C\_B, C\_C \rightarrow$
  OPENING RATIO OF SHUTTERS

ILLUMINATION CONTROLLER, ILLUMINATION CONTROL METHOD, AND IMAGING APPARATUS

CROSS-REFERENCE TO RELATED APPLICATION

This application is a continuation of PCT international application Ser. No. PCT/JP2007/056969 filed on Mar. 29, 2007 which designates the United States, incorporated herein by reference, and which claims the benefit of priority from Japanese Patent Application No. 2006-308095, filed on Nov. 14, 2006, the entire contents of which are incorporated herein by reference.

FIELD

The embodiments discussed herein are directed to an illumination controller and an illumination control method that control an illumination device that irradiates an object to be photographed with illumination light, and an imaging apparatus that photographs an image of an object by irradiating the object with illumination light from an illumination device.

BACKGROUND

Imaging apparatuses that irradiate a closely situated object with illumination light and photographing the object have been used for biometric authentication and monitoring. For example, as shown in FIG. 15, in a photographing environment where the biometric authentication is performed, there exists ambient (external) light (or environmental light) other than light emitted from its own illumination provided in the imaging apparatus. Accordingly, an angle and intensity toward an object cannot be controlled, thereby increasing a difference between an image to be authenticated photographed in such a photographing environment, and a correlation image photographed in a photographing environment without an influence of ambient light. As a result, the accuracy of authentication may be affected. Therefore, the photographing environment for performing biometric authentication is limited to the environment without ambient light or to that with weak ambient light.

In response, for example, as shown in FIGS. 16 and 17, a technology is disclosed for acquiring an image from which an influence of ambient light is eliminated, by calculating a difference between an image photographed by turning on its own illumination, and an image photographed while leaving its own illumination turned off. In the technology disclosed in, for example, Japanese Laid-open Patent Publication No. H17-19823.

A technology is also disclosed in which a view finder of a video camera that becomes difficult to see due to the influence of ambient light is made viewable, by collecting ambient light in the apparatus and actively using the ambient light as a backlight. See, for example, Japanese Laid-open Patent Publication No. H7-95451.

However, with the conventional technologies, the quality of a photographed image maybe deteriorated, or the collected ambient light may sometimes be unsuitable for illumination, etc.

In other words, with the conventional technology that acquires an image from which the influence of ambient light is eliminated, by calculating a difference between an image photographed by turning on its own illumination and an image photographed while leaving its own illumination turned off, for example, as shown in FIG. 18, the contribution of its own illumination relatively decreases with the increase of ambient light. Accordingly, a signal-to-noise (S/N) ratio of an image deteriorates.

With the conventional technology in which a view finder of a video camera that becomes difficult to see due to the influence of ambient light is made viewable, by collecting ambient light in the apparatus and actively using the ambient light as a backlight, the collected light is used. However, with an imaging apparatus used for biometric authentication, characteristics of light such as wavelength are sometimes unsuitable for its own illumination.

SUMMARY

According to an aspect of the invention, the invention is directed to an illumination controller for controlling an illumination device that irradiates an object to be photographed with illumination light. The illumination controller includes an introducing unit that introduces ambient light emitted to the object from a light source other than the illumination device; a processing unit that processes the ambient light introduced by the introducing unit to have a same characteristic as that of the illumination light; and an irradiation controlling unit that controls the ambient light processed by the processing unit so as to irradiate the object therewith as illumination, from a same path as the irradiation path of the illumination light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a schematic for explaining calculation of a light amount ratio according to the first embodiment;

FIG. 6 is a schematic for explaining calculation of an opening ratio of shutters and the total amount of guided light;

DESCRIPTION OF EMBODIMENTS

Preferred embodiments of an illumination controller, an illumination control method, and an imaging apparatus in accordance with the present invention will be explained with reference to the accompanying drawings. In the following, the illumination controller according to the present invention is described as a first embodiment, and the other embodiments included in the present invention will then be described.

First Embodiment

In the following first embodiment, an outline and characteristics of an illumination controller according to the first embodiment, and a configuration and a processing flow of the illumination controller are sequentially described, followed by the advantages of the first embodiment.

Outline and Characteristics of Illumination Controller

First Embodiment

Figure 1:
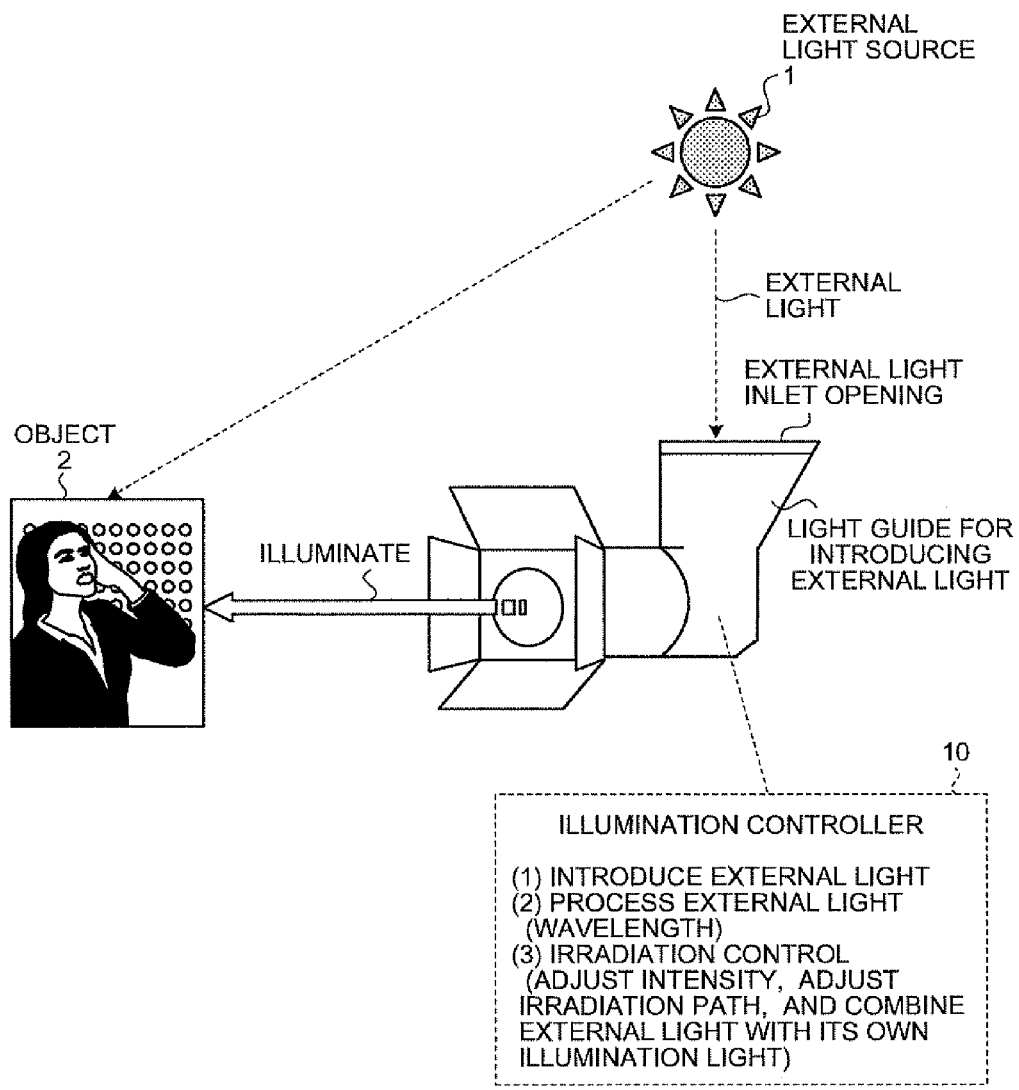
FIG. 1 is a schematic for explaining an outline and characteristics of an illumination controller according to a first embodiment of the present invention.

With reference to FIG. 1, an outline and characteristics of the illumination controller according to the first embodiment will be described. FIG. 1 is a schematic for explaining an outline and characteristics of the illumination controller according to the first embodiment.

An outline of the illumination controller according to the first embodiment is to control an illumination device (such as light emitting diode (LED) illumination and fiber illumination) that irradiates an object to be photographed with illumination light. A main characteristic of the illumination controller according to the first embodiment is to introduce ambient light (also called "external" light) from an ambient light source (also called external light source) (such as the sun and/or indoor lighting equipment) and use the ambient light as illumination.

The main characteristic will be described in detail. As shown in FIG. 1, an illumination controller 10 according to the first embodiment is installed with an ambient light inlet opening that faces the ambient light emitted from an ambient light source 1 (such as the sun and/or indoor lighting equipment) and introduces the ambient light into a device using a light guide (see (1) in FIG. 1). The light guide is not the only one that can be used to introduce ambient light into the device, but the ambient light may be introduced into the device, by using optical elements such as mirrors, optical fibers, and prisms.

The illumination controller 10 processes the ambient light introduced from the ambient light source 1, to have the same characteristics as those of illumination light emitted from its own illumination device (own illumination) (see (2) in FIG. 1). More specifically, the illumination controller 10 processes the wavelength of the introduced ambient light to be the same as that of the illumination light emitted from its own illumination, using, for example, a wavelength filter.

The illumination controller 10, for example, when ambient light having a wide wavelength distribution, such as visible light, is introduced, divides an introduction path into a plurality of paths, installs wavelength filters (such as red, green, and blue (RGB)) in each of the paths, and provides a liquid crystal shutter or a piezoelectric mirror. Accordingly, the illumination controller 10 adjusts the balance of wavelengths, by controlling the amount of light of each wavelength component (process the wavelength to be the same as that of the illumination light emitted from its own illumination). This controlling is achieved by adjusting an introduction area or by using a pulse width modulation system. The light amount is an amount of light emitted from a light source, and the light intensity (the number of light quanta per unit area per unit time) increases with the light amount.

Figure 2:
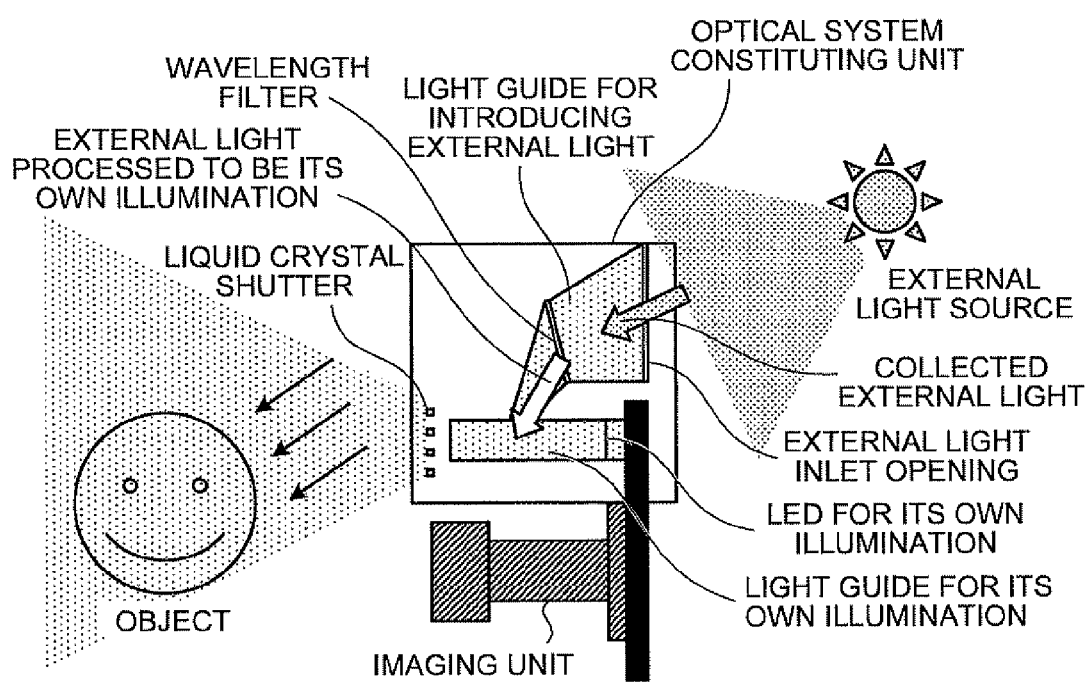
FIG. 2 is a schematic of the appearance of the illumination controller according to the first embodiment.

Describing more specifically, a part of the illumination controller 10, for example, has the appearance as shown in FIG. 2. The illumination controller 10 includes an optical system constituting unit made of an ambient light inlet opening, a light guide for introducing ambient light, a wavelength filter, an LED for its own illumination, a light guide for its own illumination, and liquid crystal shutters.

Figure 3:
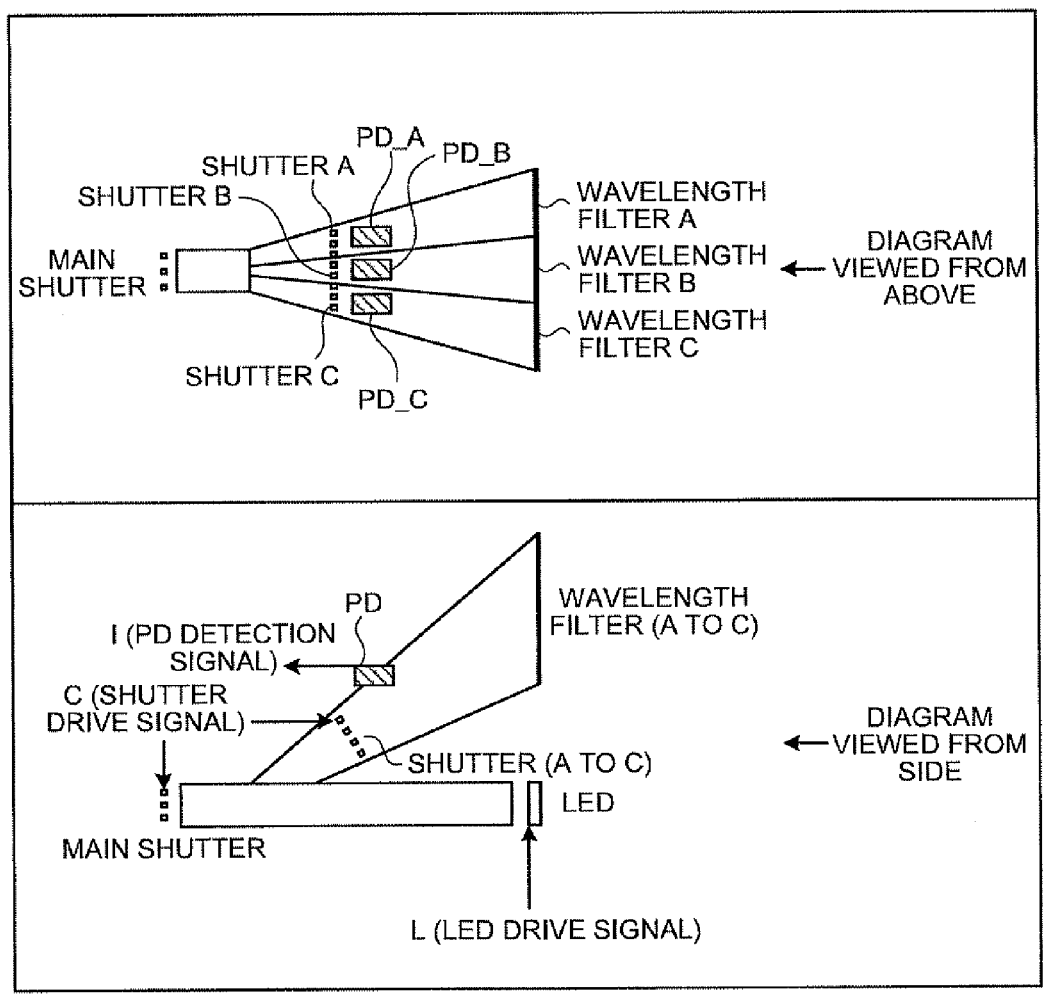
FIG. 3 is a schematic of the specific appearance of an optical system constituting unit according to the first embodiment.

The optical system constituting unit includes therein an introduction path for ambient light divided into a plurality of paths. Wavelength filters (such as wavelength filters A, B, and C) that divide the introduced ambient light into wavelength regions, photodetectors (PD) (such as PD_A, PD_B, and PD_C) that detect the intensity of the ambient light divided into wavelength regions, and shutters (such as shutters A, shutters B, and shutters C) that adjust the light amount of the ambient light divided into wavelength regions, are installed on each introduction path (see diagram in FIG. 3 viewed from above). An illumination opening to which illumination light is emitted from the optical system constituting unit includes main shutters that control irradiation of illumination light (see diagram in FIG. 3 viewed from above).

Under such a configuration, the illumination controller 10 collects the ambient light introduced from the ambient light inlet opening by dividing into wavelength regions, by having the ambient light passed through the wavelength filters provided on the introduction paths. The illumination controller 10 then detects the intensity of the ambient light divided into wavelength regions, by each PD. Describing more specifically, the illumination controller 10 acquires a PD detection signal (a signal that converted the intensity of ambient light into an electric current) output from the PD that received ambient light, for the ambient light divided into wavelength regions.

The illumination controller 10 then processes the ambient light divided into wavelength regions, by adjusting the balance thereof, so as the ambient light has the same wavelength as that of the illumination light emitted from the LED for its own illumination (own illumination). Describing more specifically, the illumination controller 10 calculates an opening ratio of each of the shutters, so as to have the same wavelength as that of the illumination light emitted from the LED for its own illumination, by using the PD detection signal acquired for each ambient light divided into wavelength regions, and a predetermined light amount ratio for the ambient light of wavelength regions. The illumination controller 10, based on the calculated opening ratio of each of the liquid crystal shutters, adjusts an opening area of each of the shutters (shutters A, shutters B, and shutters C) (drive and adjust each liquid crystal shutter using a shutter drive signal). The rays of light that have passed through the opening portion of each of the shutters (shutters A, shutters B, and shutters C) are guided out to an irradiation path of the illumination light emitted from the LED for its own illumination, and combined. Accordingly, the light is processed to have the same wavelength as that of the illumination light emitted from the LED for its own illumination.

The illumination controller 10 then performs irradiation control (see (3) in FIG. 1), after processing the wavelength of the ambient light introduced from the ambient light source to be the same as that of the illumination light emitted from the LED for its own illumination. More specifically, based on the intensity of the ambient light processed to have the same wavelength as that of the illumination light emitted from the LED for its own illumination, the illumination controller 10 adjusts the intensity of the illumination light emitted from the LED for its own illumination. For example, the illumination controller 10 combines the ambient light processed to have the same wavelength as that of the illumination light emitted from the LED for its own illumination, with the illumination light emitted from the LED for its own illumination. The illumination controller 10 then performs controlling so as to irradiate the object 2 therewith as illumination, from the irradiation path the same as that of the illumination light emitted from the LED for its own illumination.

For example, the illumination controller 10 detects the total amount of light guided to the irradiation path of the illumination light emitted from the LED for its own illumination, from the opening portion of each of the shutters (shutters A, shutters B, and shutters C), by a PD output signal using the PD and the like. If the total amount of guided light is sufficient for photographing, the illumination controller 10 opens the main shutters using a main shutter drive signal, while leaving the LED for its own illumination turned off, and emits the illumination light processed to have the same wavelength as that of the illumination light emitted from the LED for its own illumination. If the total amount of guided light is not sufficient for photographing, the illumination controller 10 turns on the LED for its own illumination using an LED drive signal, and emits illumination light in a state that the ambient light processed to have the same wavelength as that of the illumination light emitted from the LED for its own illumination is combined with the illumination light emitted from the LED for its own illumination.

Accordingly, with the first embodiment, as described as the main characteristic, it is possible to introduce ambient light from the ambient light source (such as the sun and/or indoor lighting equipment) and use the ambient light as illumination.

Configuration of Illumination Controller

First Embodiment

Figure 4:
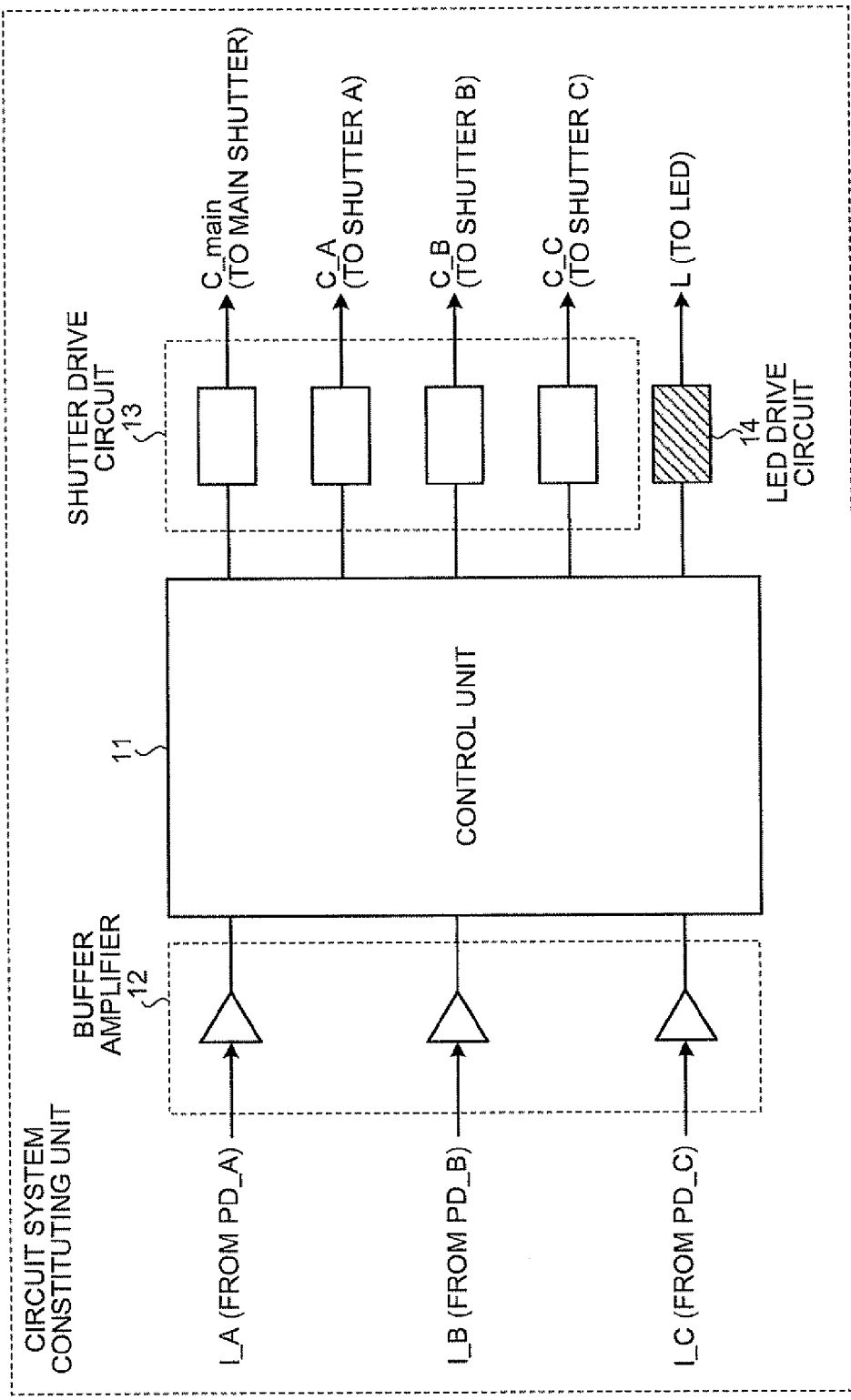
FIG. 4 is a schematic of a circuit system constituting unit of the illumination controller according to the first embodiment.

With reference to FIG. 4, a configuration of the illumination controller according to the first embodiment will be described. FIG. 4 is a schematic of a circuit system constituting unit of the illumination controller according to the first embodiment. In FIG. 4, only the configuration required to implement the illumination collector according to the first embodiment is shown, and other descriptions are omitted.

The illumination controller 10 according to the first embodiment includes an optical system constituting unit (for example, see FIG. 3) and a circuit system constituting unit. The optical system constituting unit has an introduction path of ambient light emitted from the ambient light source 1, divided into a plurality of paths. The circuit system constituting unit controls the operation of the optical system constituting unit. An "introducing unit" in the appended claims corresponds to the optical system constituting unit, and a "processing unit" and an "irradiation controlling unit" in the appended claims correspond to the optical system constituting unit and the circuit system constituting unit.

The optical system constituting unit includes an ambient light inlet opening, a light guide for introducing ambient light, a wavelength filter, an LED for its own illumination, a photodetector (PD), a light guide for its own illumination, and liquid crystal shutters (see FIG. 2).

The light guide for introducing ambient light introduces ambient light to inside from the ambient light inlet opening installed facing the ambient light source 1 (such as the sun and/or indoor lighting equipment) (see FIG. 2). The ambient light can be introduced inside, by using optical elements such as mirrors, optical fibers, and prisms, instead of using the light guide for introducing ambient light. The light guide for its own illumination guides out the illumination light emitted from the LED for its own illumination towards the direction of the object 2.

For example, a wavelength filter A that corresponds to the wavelength of red (R) of RGB three primary colors, a wavelength filter B that corresponds to the wavelength of green (G) of RGB three primary colors, and a wavelength filter C that corresponds to the wavelength of blue (B) of RGB three primary colors are installed on the introduction path divided into a plurality of paths. The wavelength filters divide the ambient light introduced inside from the ambient light inlet opening by the light guide for introducing ambient light, into wavelength regions (wavelength regions of RGB three primary colors).

The PD is installed on each of the introduction paths divided into a plurality of paths (such as PD_A, PD_B, and PD_C), and detect the intensity of the ambient light that has passed through the wavelength filters and divided into wavelength regions. More specifically, the PD converts the intensity of the ambient light received on a light-receiving surface into a current value, and outputs to a buffer amplifier 12 of the circuit system constituting unit, which will be described later, as a PD detection signal.

The liquid crystal shutters adjust the balance of the ambient light divided into wavelength regions and controls irradiation of the object 2 with illumination light. The optical system constituting unit includes shutters (such as shutters A, shutters B, and shutters C) installed on the introduction paths that adjust the light amount of the ambient light divided into the wavelength regions, and the main shutters that control the irradiation of the object 2 with illumination light (see FIG. 3), as the liquid crystal shutters. It is also possible to use a piezoelectric mirror instead of the liquid crystal shutter.

As shown in FIG. 4, the circuit system constituting unit that controls the operation of the optical system constituting unit includes a control unit 11, the buffer amplifier 12, a shutter drive circuit 13, and an LED drive circuit 14.

The buffer amplifier 12 is provided corresponding to the PDs, and convert a PD detection signal received from each of the PDs to a voltage value, and output to the control unit 11.

The control unit 11 processes the ambient light divided into wavelength regions and collected after processed, by adjusting the balance thereof, so as the ambient light has the same wavelength as that of the illumination light emitted from the LED for its own illumination. Describing more specifically, the control unit 11 calculates an opening ratio of each of the shutters (shutters A, shutters B, and shutters C: See FIG. 3), so as the ambient light has the same wavelength as that of the illumination light emitted from the LED for its own illumination. This is calculated by using voltage values received from the buffer amplifier 12, and a predetermined light amount ratio of the ambient light of the wavelength regions (wavelength regions of RGB three primary colors).

The calculation of a light amount ratio is briefly explained, using an example that the illumination light emitted from the LED for its own illumination is white light. The International Commission on Illumination (CIE) defined that white light is composed of RGB three primary colors of R at 700.0 nanometers, G at 546.3 nanometers, and B at 435.8 nanometers. If the wavelength filters having the wavelength peaks are installed, the light amount ratio is calculated as follows: The CIE tristimulus values XYZ of white light are X:Y:Z=1:1:1, and converted to the RGB system using formula (1) in FIG. 5. Subsequently, if X=Y=Z is assigned to the formula, (2) in FIG. 5 can be obtained. Then, as shown in (3) in FIG. 5, the light amount ratio of R:G:B≈4:3:3 is calculated from (2) in FIG. 5.

By using the light amount ratio calculated in this manner, the control unit 11 calculates an opening ratio of each shutter as follows: In other words, as shown in (1) in FIG. 6, the control unit 11 calculates the minimum value from a plurality of values obtained by dividing each voltage value by each constant of the corresponding light amount ratio. For example, if the illumination light emitted from the LED for its own illumination is white light, and if the wavelength filter A corresponds to the wavelength of R of RGB three primary colors, the control unit 11 divides the voltage value, whose PD detection signal received from the introduction path the same as that where the wavelength filter A is installed, is converted to a voltage by the buffer amplifier 12, by a constant of "4" of the light amount ratio. Similarly, if the wavelength filter B corresponds to the wavelength of G of RGB three primary colors, the control unit 11 divides the voltage value of the path the same as that where the wavelength filter B is installed, by a constant of "3" of the light amount ratio. If the wavelength filter C corresponds to the wavelength of B of RGB three primary colors, the control unit 11 divides the voltage value of the path the same as that where the wavelength filter C is installed, by a constant of "3" of the light amount ratio. The control unit 11 then calculates the minimum value from the values obtained by dividing.

As shown in (2) in FIG. 6, the control unit 11 then calculates an opening ratio of each of the shutters (C_A, C_B, and C_C) by dividing the values obtained by multiplying the calculated minimum value with each constant of the light amount ratio, by the voltage value corresponding to each constant. The control unit 11 then generates a shutter drive signal that corresponds to the opening ratio of each shutter being calculated, in each of the shutter drive circuit 13.

The rays of light that have passed through the opening portion of each of the shutters (shutters A, shutters B, and shutters C) whose opening area is adjusted based on the opening ratio, are guided out to the irradiation path of the illumination light emitted from the LED for its own illumination and combined. Accordingly, the light is processed to have the same wavelength as that of the illumination light emitted from the LED for its own illumination.

The control unit 11, after processing the wavelength of the introduced ambient light to be the same as that of the illumination light emitted from the LED for its own illumination, performs irradiation control. Describing more specifically, the control unit 11 adjusts the intensity of the illumination light emitted from the LED for its own illumination, based on the intensity of the ambient light processed to have the same wavelength as that of the illumination light emitted from the LED for its own illumination. The control unit 11 combines the ambient light processed to have the same wavelength as that of the illumination light emitted from the LED for its own illumination, with the illumination light emitted from the LED for its own illumination. The control unit 11 then performs controlling so as to irradiate the object 2 with the combined illumination light, from the irradiation path the same as that of the illumination light emitted from the LED for its own illumination.

For example, the control unit 11 calculates the total amount of light guided to the irradiation path of the illumination light emitted from the LED for its own illumination, from the opening portion of each of the shutters (shutters A, shutters B, and shutters C), by multiplying the minimum value described above, with the total of constants of the light amount ratio (see (3) in FIG. 6). The control unit 11 detects the total amount of guided light by the PD output signal using the PD. If the total amount of guided light being calculated is sufficient for photographing, the control unit 11 opens the main shutters by generating and outputting a main shutter drive signal from the shutter drive circuit 13, and emits illumination while leaving the LED for its own illumination turned off.

If the total amount of guided light is not sufficient for photographing, the control unit 11 turns on the LED for its own illumination, by generating and outputting an LED drive signal from the LED drive circuit 14, and opens the main shutters by generating and outputting a main shutter drive signal from the shutter drive circuit 13. The control unit 11 then emits illumination in a state that the ambient light processed to have the same wavelength as that of the illumination light emitted from the LED for its own illumination is combined with the illumination light emitted from the LED for its own illumination. The control unit 11 may also output the LED drive signal to turn on the LED for its own illumination in a state that the light amount is adjusted, so as to supply the insufficient light amount for photographing. This is enabled by subtracting the light amount of the ambient light processed to have the same wavelength as that of the illumination light emitted from the LED for its own illumination. If the quality of the photograph is the top priority, the control unit 11 may output the LED drive signal so as to turn on the LED for its own illumination, in a state that the light amount is always adjusted to the maximum.

The shutter drive circuit 13 generate a shutter drive signal and output to each shutter, to adjust the opening area of each of the shutters (shutters A, shutters B, and shutters C: See FIG. 3) depending on the opening ratio. The LED drive circuit 14 generates an LED drive signal and outputs to the LED for its own illumination, to turn on the LED for its own illumination.

Processing Performed by Illumination Controller

First Embodiment

Figure 7:
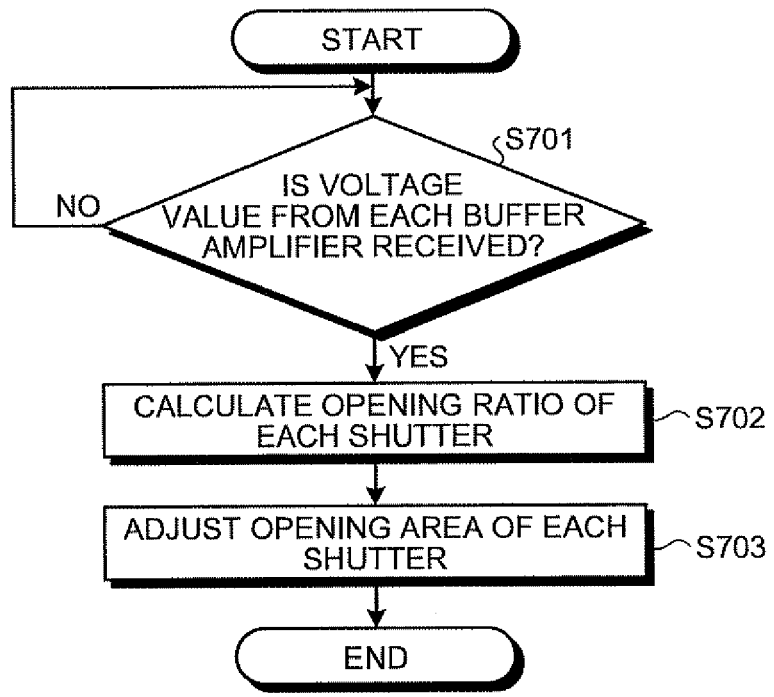
FIG. 7 is a flowchart of a processing flow of ambient light performed by the illumination controller according to the first embodiment.
Figure 8:
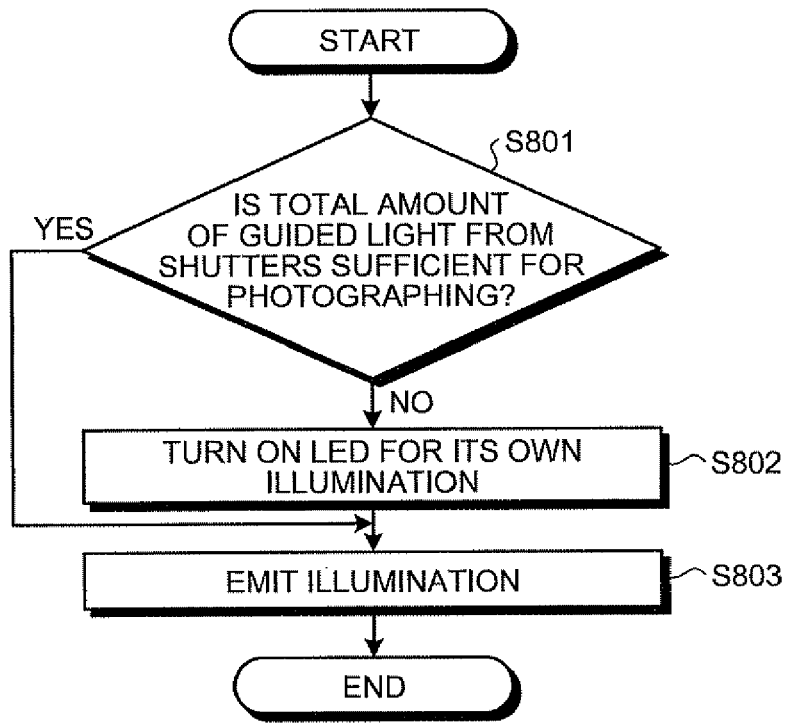
FIG. 8 is a flowchart of a processing flow of irradiation control performed by the illumination controller according to the first embodiment.

With reference to FIGS. 7 and 8, for example, a processing performed by the illumination controller according to the first embodiment will be described. FIG. 7 is a flowchart of a processing flow of ambient light performed by the illumination controller according to the first embodiment. FIG. 8 is a flowchart of a processing flow of irradiation control performed by the illumination controller according to the first embodiment.

Processing of Ambient Light

First Embodiment

With reference to FIG. 7, a processing of ambient light performed by the illumination controller according to the first embodiment will be described. As shown in FIG. 7, on receiving voltage values from the buffer amplifier 12 (YES at Step S701), the control unit 11 calculates an opening ratio of each of the shutters (shutters A, shutters B, and shutters C: See FIG. 3), so as the ambient light has the same wavelength as that of the illumination light emitted from the LED for its own illumination. This is calculated by using the voltage values received from the buffer amplifier 12, and a predetermined light amount ratio of the ambient light of the wavelength regions (wavelength regions of RGB three primary colors) (Step S702).

The calculation of the light amount ratio will briefly be explained, using an example that the illumination light emitted from the LED for its own illumination is white light. The International Commission on Illumination (CIE) defined that white light is composed of RGB three primary colors of R at 700.0 nanometers, G at 546.3 nanometers, and B at 435.8 nanometers. If the wavelength filters having the wavelength peaks are installed, the light amount ratio is calculated as follows: The CIE tristimulus values XYZ of white light are X:Y:Z=1:1:1, and converted to the ROB system using formula (1) in FIG. 5. Subsequently, if X=Y=Z is assigned to the formula, (2) in FIG. 5 can be obtained. Then, as shown in (3) in FIG. 5, the light amount ratio of R:G:B=4:3:3 is calculated from (2) in FIG. 5.

By using the light amount ratio calculated in this manner, the control unit 11 calculates an opening ratio of each shutter as follows: In other words, as shown in (1) in FIG. 6, the control unit 11 calculates the minimum value from a plurality of values obtained by dividing each voltage value by each constant of the corresponding light amount ratio. For example, if the illumination light emitted from the LED for its own illumination is white light, and if the wavelength filter A corresponds to the wavelength of R of RGB three primary colors, the control unit 11 divides the voltage value whose PD detection signal received from the introduction path the same as that where the wavelength filter A is installed, is converted to a voltage by the buffer amplifier 12, by a constant of "4" of the light amount ratio. Similarly, if the wavelength filter B corresponds to the wavelength of G of RGB three primary colors, the control unit 11 divides the voltage value of the path the same as that where the wavelength filter B is installed, by a constant of "3" of the light amount ratio. If the wavelength filter C corresponds to the wavelength of B of RGB three primary colors, the control unit 11 divides the voltage value of the path the same as that where the wavelength filter C is installed, by a constant of "3" of the light amount ratio. The control unit 11 then calculates the minimum value from the values obtained by dividing.

As shown in (2) in FIG. 6, the control unit 11 calculates an opening ratio of each of the shutters (C_A, C_B, and C_C), by dividing the values obtained by multiplying the calculated minimum value with each constant of the light amount ratio, by the voltage value corresponding to each constant. The control unit 11 then generates a shutter drive signal that corresponds to the opening ratio of each of the shutters being calculated in each of the shutter drive circuit 13.

The shutter drive circuit 13 adjust the opening area of each of the shutters (shutters A, shutters B, and shutters C: See FIG. 3) based on the opening ratio, by outputting the generated shutter drive signal to each of the shutters (Step S703).

The rays of light that have passed through the opening portion of each of the shutters (shutters A, shutters B, and shutters C) whose opening area is adjusted based on the opening ratio are guided out to the irradiation path of the illumination light emitted from the LED for its own illumination and combined. Accordingly, the light is processed to have the same wavelength as that of the illumination light emitted from the LED for its own illumination.

Irradiation Controlling Process

First Embodiment

With reference to FIG. 8, irradiation controlling process performed by the illumination controller according to the first embodiment will be described. As shown in FIG. 8, the control unit 11 determines whether the total amount of light guided to the irradiation path of the illumination light emitted from the LED for its own illumination is sufficient for photographing, from an opening portion of each of the shutters (shutters A, shutters B, and shutters C) and an output of each of PDs (PD_A, PD_B, and PD_C) (Step S801).

As a result of determination, if the total amount of guided light is not sufficient for photographing (NO at Step S801), the control unit 11 generates and outputs an LED drive signal from the LED drive circuit 14, and turns on the LED for its own illumination (Step S802). The control unit 11 also opens the main shutters by generating and outputting a main shutter drive signal from the shutter drive circuit 13. The control unit 11 then emits illumination in a state that the ambient light processed to have the same wavelength as that of the illumination light emitted from the LED for its own illumination is combined with the illumination light emitted from the LED for its own illumination (Step S803).

If the total amount of guided light is sufficient for photographing (YES at Step S801), the control unit 11 opens the main shutters by generating and outputting a main shutter drive signal from the shutter drive circuit 13. The control unit 11 then emits illumination while leaving the LED for its own illumination turned off (Step S803).

The control unit 11 may also output the LED drive signal to turn on the LED for its own illumination in a state that the light amount is adjusted, so as to supply the insufficient light amount for photographing, by subtracting the light amount of the ambient light processed to have the same wavelength as that of the illumination light emitted from the LED for its own illumination. If the quality of the photograph is the top priority, the control unit 11 may output the LED drive signal so as to turn on the LED for its own illumination, in a state that the light amount is always adjusted to the maximum.

Advantages of First Embodiment

As described above, with the first embodiment, the ambient light emitted to the object is introduced from the ambient light source, and processed to have the same wavelength as that of the illumination light emitted from the LED for its own illumination. The processed ambient light is controlled so as to irradiate the object therewith as illumination, from the irradiation path the same as that of the illumination light emitted from the LED for its own illumination. Accordingly, for example, it is possible to process the ambient light introduced from the sun, indoor lighting, and the like, to the light that has the same wavelength as that of the illumination light emitted from the LED for its own illumination controlled by itself. Subsequently, the light can be emitted as illumination that has the same irradiation angle and irradiation distribution therewith, and also be used as its own illumination. Even in the photographing environment with strong ambient light, such as bright outdoors, it is possible to naturally strengthen the illumination intensity corresponding to the intensity of ambient light.

With the first embodiment, the ambient light processed to have the same wavelength as that of the illumination light emitted from the LED for its own illumination is combined with the illumination light emitted from the LED for its own illumination, and controlled so as to irradiate the object therewith as illumination. Accordingly, for example, if in an environment where the intensity of ambient light is weak, it is possible to suitably strengthen its own illumination by the illumination light, and emit the light.

With the first embodiment, the wavelength of ambient light is processed to be the same as that of the illumination light emitted from the LED for its own illumination. Accordingly, it is possible to suitably process the wavelength of the introduced ambient light that is the main characteristic to serve as illumination, thereby enabling the introduced ambient light to be used as its own illumination.

With the first embodiment, the wavelength of ambient light is processed to be the same as that of the illumination light emitted from the LED for its own illumination, by using the wavelength filters. Accordingly, it is possible to suitably process the introduced ambient light with a simple configuration.

With the first embodiment, the ambient light is introduced by using one or a plurality of light guides, mirrors, optical fibers, and prisms. Accordingly, it is possible to introduce the ambient light with a simple configuration.

With the first embodiment, when the introduced ambient light has a plurality of wavelengths, the light amount of each of the wavelengths is controlled. For example, with the ambient light that has a wide wavelength distribution, such as visible light, the balance of wavelengths can be adjusted by controlling the light amount of each of the wavelength components, such as RGB. Accordingly, it is possible to process the ambient light so as to have the same wavelength distribution as that of the illumination light emitted from the LED for its own illumination.

With the first embodiment, the light amount of the introduced ambient light is controlled by the liquid crystal shutters. Accordingly, it is possible to control the light amount of introduced ambient light with a simple configuration.

With the first embodiment, the intensity of the illumination light emitted from the LED for its own illumination is adjusted, based on the intensity of the introduced ambient light. The ambient light processed to have the same wavelength as that of the illumination light emitted from the LED for its own illumination is then combined with the illumination light emitted from its own illumination, and controlled so as to irradiate the object therewith as illumination. Accordingly, it is possible to save the power required for turning on the illumination light emitted from the LED for its own illumination, while providing sufficient illumination intensity.

Second Embodiment

A predetermined image can be obtained, by applying the illumination controller according to the first embodiment to an imaging apparatus. In the following second embodiment, an outline and characteristics of an imaging apparatus applied with the illumination controller according to the first embodiment, and a configuration and a processing flow of the imaging apparatus are sequentially described, followed by the advantages of the second embodiment.

Outline and Characteristics of Imaging Apparatus

Second Embodiment

Figure 9:
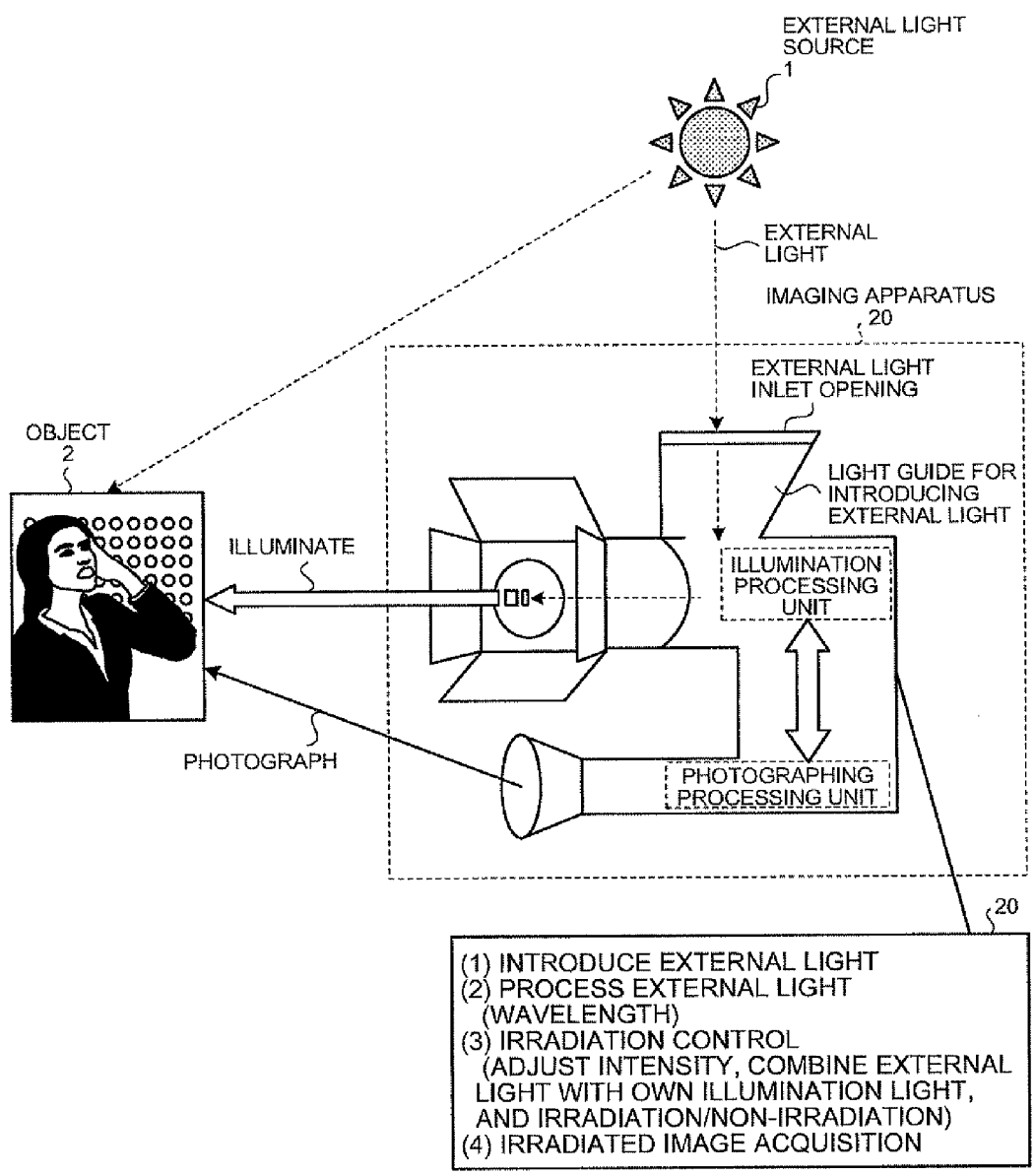
FIG. 9 is a schematic for explaining an outline and characteristics of an imaging apparatus according to a second embodiment.

With reference to FIG. 9, an outline and characteristics of the imaging apparatus according to the second embodiment will be described. FIG. 9 is a schematic of an outline and characteristics of the imaging apparatus according to the second embodiment. An imaging apparatus 20 according to the second embodiment has the same appearance (see FIG. 2) as that of the illumination controller described in the first embodiment, and also includes the optical system constituting unit (see FIG. 3).

An outline of the imaging apparatus 20 according to the second embodiment is to irradiate an object with illumination light from an illumination device (such as an LED illumination and a fiber illumination), and photographs an image of the object. A main characteristic thereof is to use ambient light introduced from an ambient light source (such as the sun and/or indoor lighting equipment) as illumination, and to obtain an image from which the influence of ambient light is eliminated.

As in the first embodiment, the imaging apparatus 20 according to the second embodiment, in an illumination processing unit, processes the ambient light divided into wavelength regions and collected, by adjusting the balance thereof, so as the ambient light has the same wavelength as that of the illumination light emitted from the LED for its own illumination. Also as in the first embodiment, the imaging apparatus 20 according to the second embodiment adjusts the intensity of the illumination light emitted from the LED for its own illumination, based on the intensity of the ambient light processed to have the same wavelength as that of the illumination light emitted from the LED for its own illumination. However, the main characteristic of the imaging apparatus 20 according to the second embodiment is as follows:

In other words, describing the main characteristic more specifically, as shown in FIG. 9, the imaging apparatus 20 according to the second embodiment obtains an irradiated image in a photographing processing unit (see (4) in FIG. 9).

Figure 16:
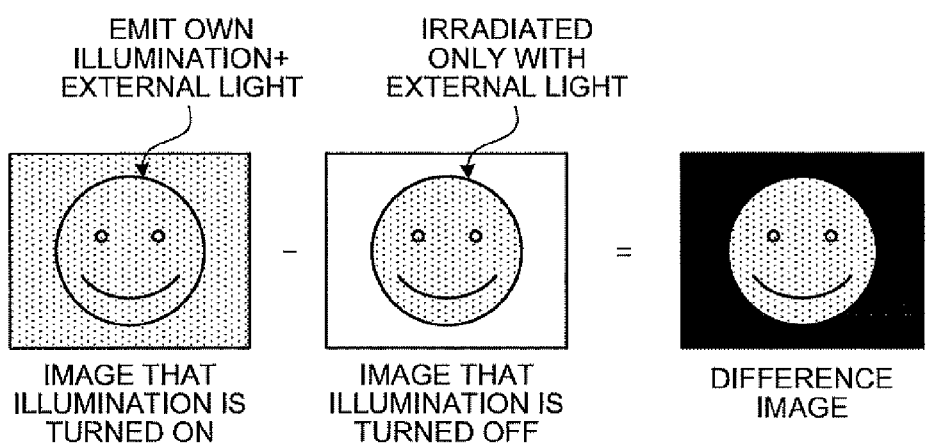
FIG. 16 is a schematic for explaining another conventional technology.
Figure 17:
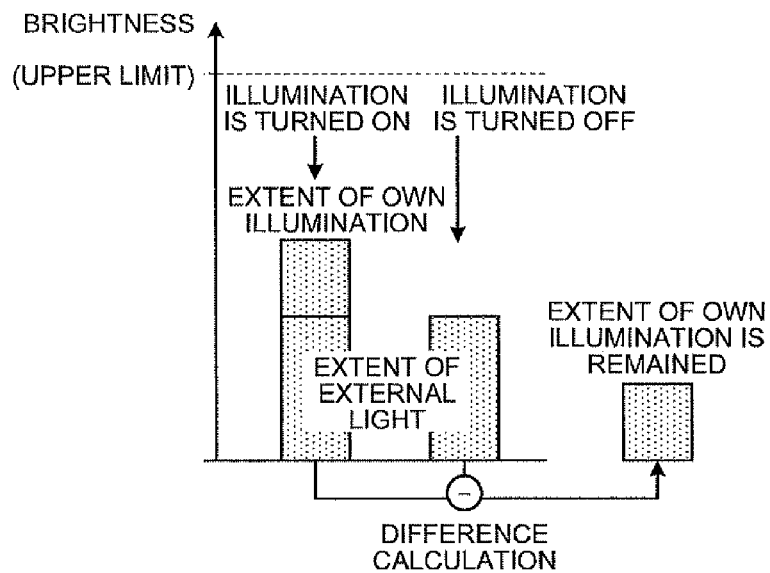
FIG. 17 is a schematic of the principle of acquiring a differential image in the conventional technology.
Figure 18:
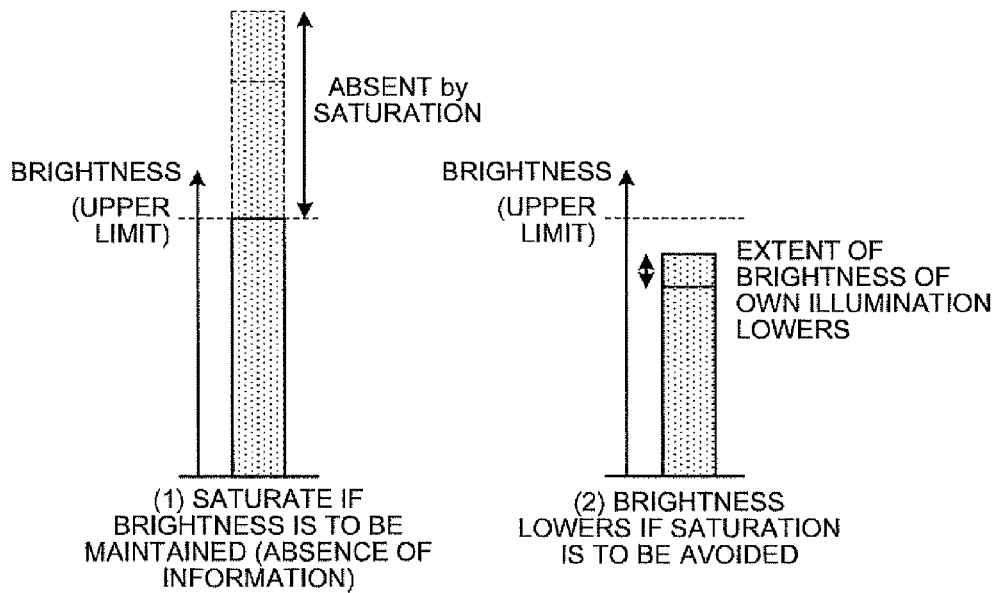
FIG. 18 is a schematic of the problem in the conventional technology.

Describing more specifically, the imaging apparatus 20 outputs an imaging synchronization signal to synchronize irradiation of illumination with the timing of imaging performed in a photographing processing unit, from the photographing processing unit to an illumination processing unit. The imaging apparatus 20, then obtains an image of the object 2 irradiated only with illumination, by taking a difference (difference of image brightness) between an irradiated image of the object 2 photographed while being irradiated, and a non-irradiated image of the object 2 photographed while not being irradiated (for example, see FIG. 16).

In this manner, with the second embodiment, as the main characteristic described above, for example, the ambient light introduced from the sun, the indoor lighting, and the like, can be processed to the light that has the same characteristics (such as wavelength) as those of the illumination light emitted from its own illumination, and use the light. Accordingly, it is possible to obtain an image from which the influence of ambient light is eliminated.

Configuration of Imaging Apparatus

Second Embodiment

Figure 10:
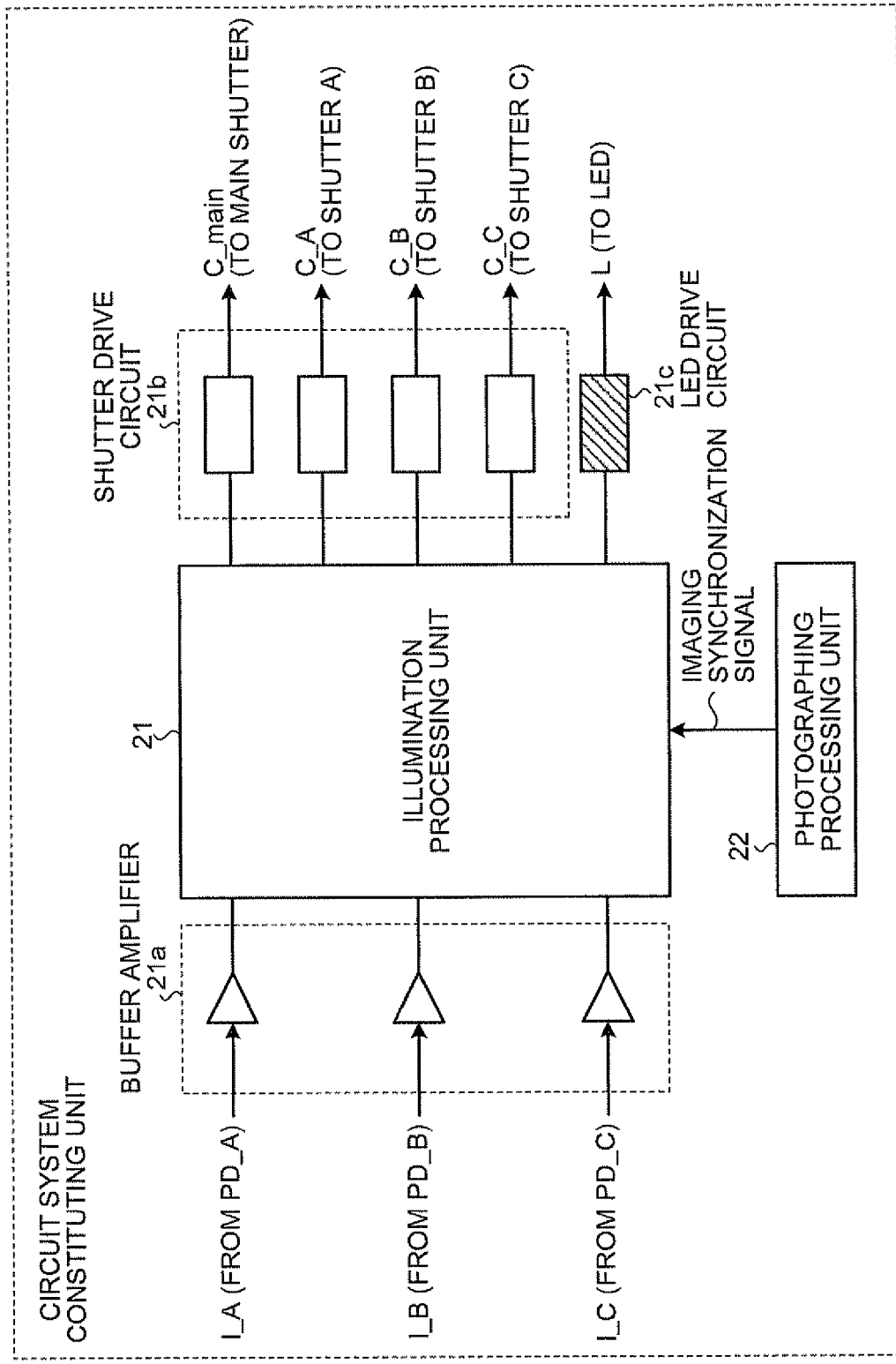
FIG. 10 is a schematic of a circuit system constituting unit of the imaging apparatus according to the second embodiment.

With reference to FIG. 10, a configuration of the imaging apparatus according to the second embodiment will be described. FIG. 10 is a schematic of a circuit system constituting unit of the imaging apparatus according to the second embodiment. In FIG. 10, the configuration required to implement the imaging apparatus according to the second embodiment is only shown, and other descriptions are omitted.

The imaging apparatus 20 according to the second embodiment includes an optical system constituting unit (for example, see FIG. 3) and a circuit system constituting unit (see FIG. 10). The optical system constituting unit has an introduction path for ambient light divided into a plurality of paths, emitted from the ambient light source 1. The circuit system constituting unit has an illumination processing unit 21 that controls an operation of the optical system constituting unit, and a photographing processing unit 22 that executes photographing with an imaging unit. The imaging apparatus 20 according to the second embodiment differs from the illumination controller according to the first embodiment in the following points.

The illumination processing unit 21, similar to the control unit 11 of the circuit system constituting unit described in the first embodiment, adjusts the intensity of the illumination light emitted from the LED for its own illumination, based on the intensity of the ambient light processed to have the same wavelength as that of the illumination light emitted from the LED for its own illumination. The illumination processing unit 21 also combines the ambient light processed to have the same wavelength as that of the illumination light emitted from the LED for its own illumination, with the illumination light emitted from the LED for its own illumination, and performs controlling so as to irradiate the object 2 therewith as illumination, from the irradiation path the same as that of the illumination light emitted from the LED for its own illumination. However, the illumination processing unit 21 also controls the timings of irradiation and non-irradiation.

Describing more specifically, the illumination processing unit 21 confirms whether an imaging synchronization signal received from the photographing processing unit 22 is "ON". As a result of confirmation, if the imaging synchronization signal is "ON", the illumination processing unit 21 determines whether the total amount of light guided to the irradiation path emitted from the LED for its own illumination, from an opening portion of each of the shutters (shutters A, shutters B, and shutters C: See FIG. 3) and an output of each the PDs (PD_A, PD_B, and PD_C: See FIG. 3), is sufficient for photographing. As a result of determination, if the total amount of guided light is sufficient for photographing, the illumination processing unit 21 opens the main shutters by generating and outputting a main shutter drive signal from a shutter drive circuit 21b, and emits illumination while leaving the LED for its own illumination turned off.

On the contrary, as a result of determination, if the total amount of guided light is not sufficient for photographing, the illumination processing unit 21 generates and outputs an LED drive signal from an LED drive circuit 21c, and turns on the LED for its own illumination. The illumination processing unit 21 then opens the main shutters by generating and outputting a main shutter drive signal from the shutter drive circuit 21b, and emits illumination in a state that the ambient light processed to have the same wavelength as that of the illumination light emitted from the LED for its own illumination is combined with the illumination light emitted from the LED for its own illumination.

After confirming whether the imaging synchronization signal received from the photographing processing unit 22 is "ON", if the imaging synchronization signal is "OFF", the illumination processing unit 21 does not output the main shutter drive signal and does not emit illumination.

The photographing processing unit 22 is a processing unit that obtains an irradiated image. Describing more specifically, the photographing processing unit 22 outputs an imaging synchronization signal used to synchronize the irradiation of illumination with the timing of imaging, to the illumination processing unit 21. The photographing processing unit 22 photographs and obtains an image of the object 2 while being irradiated and while not being irradiated, by photographing performed in correlation with the illumination processing unit 21. The photographing processing unit 22 then obtains an image (irradiated image) in which the object 2 is irradiated only with illumination, by taking a difference (difference of image brightness) between an irradiated image of the object 2 photographed while being irradiated, and a non-irradiated image of the object 2 photographed while not being irradiated (for example, see FIG. 16). The photographing processing unit 22 photographs and obtains an image of the object 2, using the imaging unit (see FIG. 2) formed by a predetermined finder and a lens.

An "image acquiring unit" in the appended claims corresponds to the photographing processing unit 22.

Processing Performed by Imaging Apparatus

Second Embodiment

Figure 11:
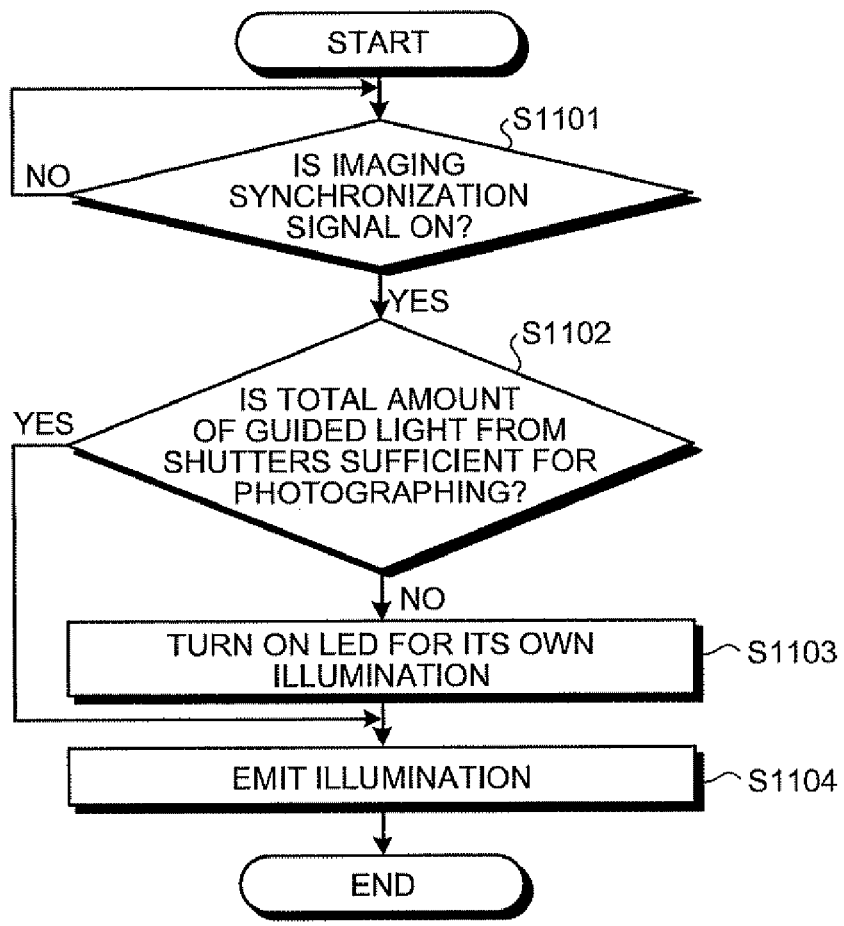
FIG. 11 is a flowchart of a processing flow of irradiation control performed by the imaging apparatus according to the second embodiment.
Figure 12:
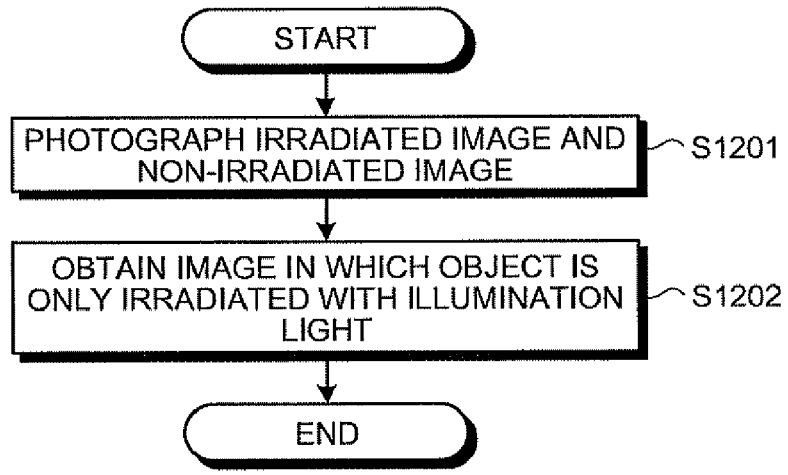
FIG. 12 is a flowchart of a processing flow of image acquisition according to the second embodiment.

With reference to FIGS. 11 and 12, a processing performed by the imaging apparatus according to the second embodiment will be described. FIG. 11 is a flowchart of a processing flow of irradiation control performed by the imaging apparatus according to the second embodiment. FIG. 12 is a flowchart of a processing flow of image acquisition according to the second embodiment.

Irradiation Controlling Process

Second Embodiment

With reference to FIG. 11, an irradiation controlling process according to the second embodiment will be described. For example, when a user turns on the power of the imaging apparatus 20, as shown in FIG. 11, the illumination processing unit 21 confirms whether an imaging synchronization signal received from the photographing processing unit 22 is "ON" (Step S1101). As a result of confirmation, if the image synchronization signal is "ON" (YES at Step S1101), the illumination processing unit 21 determines whether the total amount of light guided to the irradiation path of the illumination light emitted from the LED for its own illumination, from the opening portion of each of the shutters (shutters A, shutters B, and shutters C: See FIG. 3) and the output of each of the PDs ( . . . ), is sufficient for photographing (Step S1102).

As a result of determination, if the total amount of guided light is not sufficient for photographing (NO at Step S1102), the illumination processing unit 21 generates and output an LED drive signal from the LED drive circuit 21c, and turns on the LED for its own illumination (Step S1103). The illumination processing unit 21 then opens the main shutters, by generating and outputting a main shutter drive signal from the shutter drive circuit 21b, and emits illumination in a state that the ambient light processed to have the same wavelength as that of the illumination light emitted from the LED for its own illumination is combined with the illumination light emitted from the LED for its own illumination (Step S1104).

As a result of determination, if the total amount of guided light is sufficient for photographing (YES at Step S1102), the illumination processing unit 21 opens the main shutters by generating and outputting a main shutter drive signal from the shutter drive circuit 21b. The illumination processing unit 21 then emits illumination while leaving the LED for its own illumination turned off (Step S1104).

Referring back to Step S1101, after confirming whether the imaging synchronization signal received from the photographing processing unit 22 is "ON", if the imaging synchronization signal is "OFF" (NO at Step S1101), the illumination processing unit 21 outputs the main shutter closing signal, and does not emit illumination.

Image Acquisition Process

Second Embodiment

With reference to FIG. 12, an image acquisition process according to the second embodiment will be described. The photographing processing unit 22 outputs an imaging synchronization signal to synchronize the irradiation of illumination with the timing of imaging, to the illumination processing unit 21. As shown in FIG. 12, the photographing processing unit 22 photographs and obtains an image of the object 2 while being irradiated and while not being irradiated, by photographing performed in correlation with the illumination processing unit 21 (Step S1201). The photographing processing unit 22 obtains an image (irradiated image) in which the object 2 is irradiated only with illumination light (Step S1202), by taking a difference (difference of image brightness) between an irradiated image of the object 2 photographed while being irradiated, and a non-irradiated image of the object 2 photographed while not being irradiated.

Advantages of Second Embodiment

As described above, with the second embodiment, the ambient light introduced from the ambient light source is processed to have the same wavelength as that of the illumination light emitted from the LED for its own illumination. The ambient light processed to have the same wavelength as that of the illumination light emitted from the LED for its own illumination is controlled so as to irradiate the object 2 therewith as illumination, from the irradiation path the same as that of the illumination light emitted from the LED for its own illumination. An image in which the object 2 is irradiated only with illumination light, is obtained by controlling the irradiation and the non-irradiation of illumination by synchronizing with the timing that the image of the object 2 is photographed, and by taking a difference between an image photographed while being irradiated and an image photographed while not being irradiated. Accordingly, it is possible to process and use the ambient light introduced from, for example, the sun and/or indoor lighting, to the illumination light having the same wavelength as that of the illumination light emitted from the LED for its own illumination. Subsequently, it is possible to obtain an optimum image from which the influence of ambient light is eliminated, to be used for biometric authentication and monitoring. Even in the photographing environment with strong ambient light, such as bright outdoors, it is possible to naturally strengthen the illumination strength based on the strength of ambient light. Accordingly, it is possible to obtain an optimum image, for example, to be used for biometric authentication and monitoring, regardless of environment.

In the second embodiment, an image in which the object 2 is irradiated only with illumination (irradiated image) is obtained, by taking a difference (difference of image brightness) between an irradiated image and a non-irradiated image photographed by the photographing processing unit 22. However, the present invention is not limited to this, and it is also possible to obtain an irradiated image photographed by the photographing processing unit 22.

In the second embodiment, the illumination controller according to the present invention is applied to the imaging apparatus. However, the present invention is not limited to this, and for example, the illumination controller according to the present invention can similarly be applied to technologies for backlight used for a view finder of a video camera.

Third Embodiment

Figure 13:
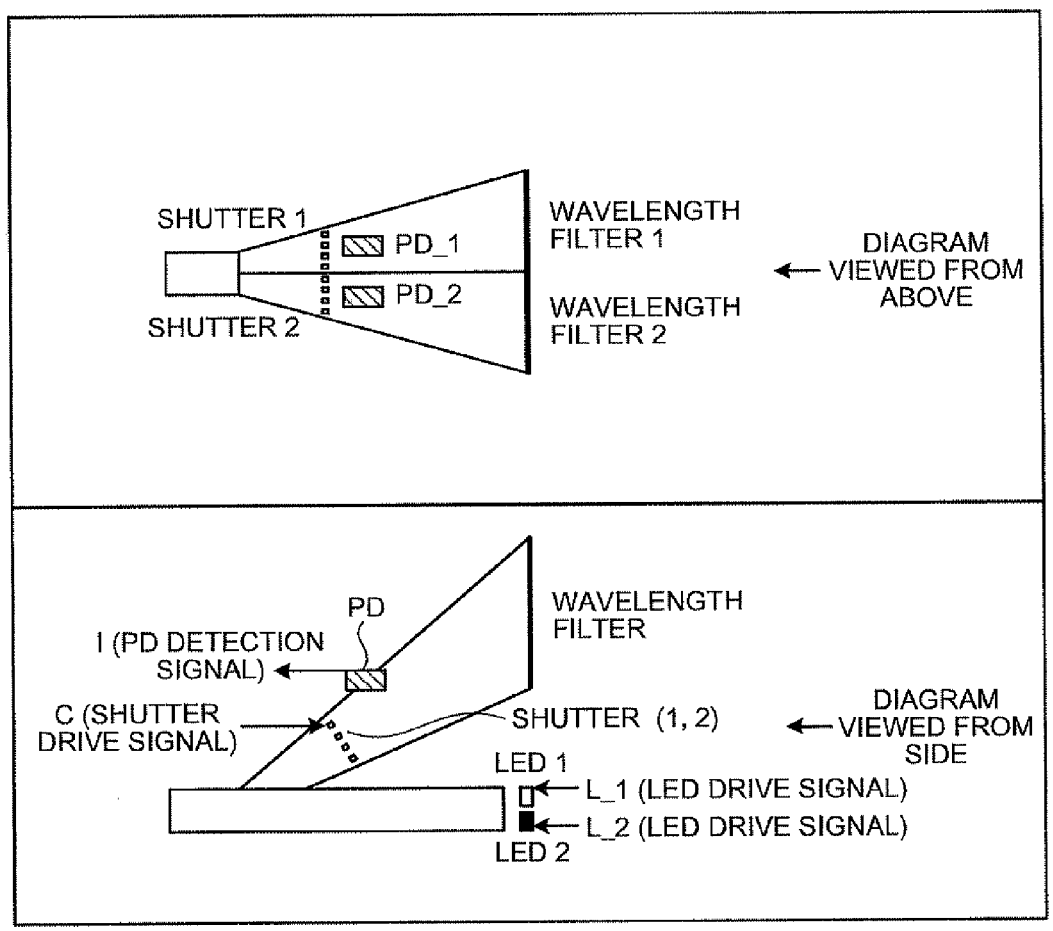
FIG. 13 is a schematic of the specific appearance of an optical system constituting unit of an imaging apparatus according to a third embodiment.
Figure 14:
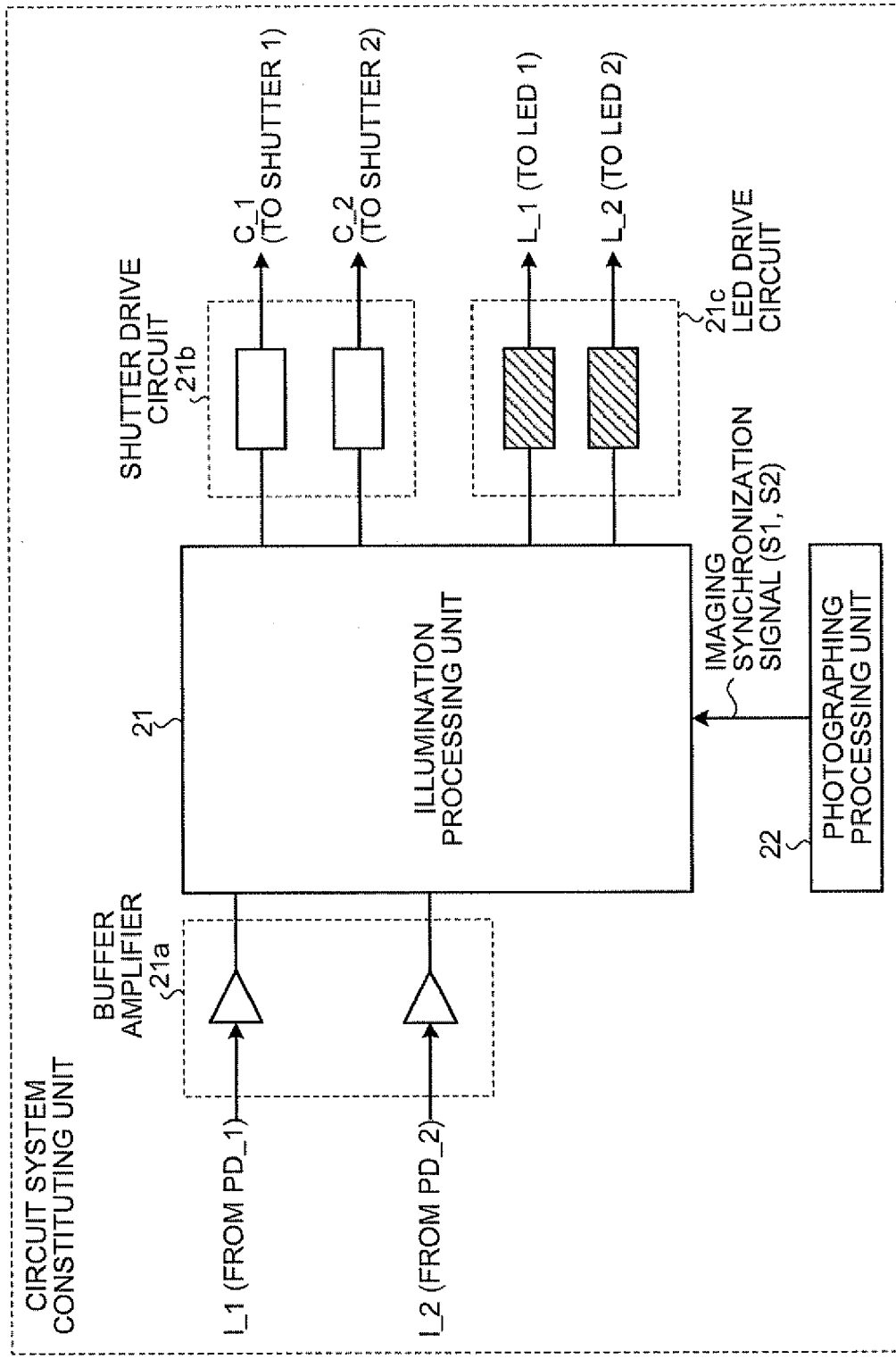
FIG. 14 is a schematic of a circuit system constituting unit of the imaging apparatus according to the third embodiment.
Figure 15:
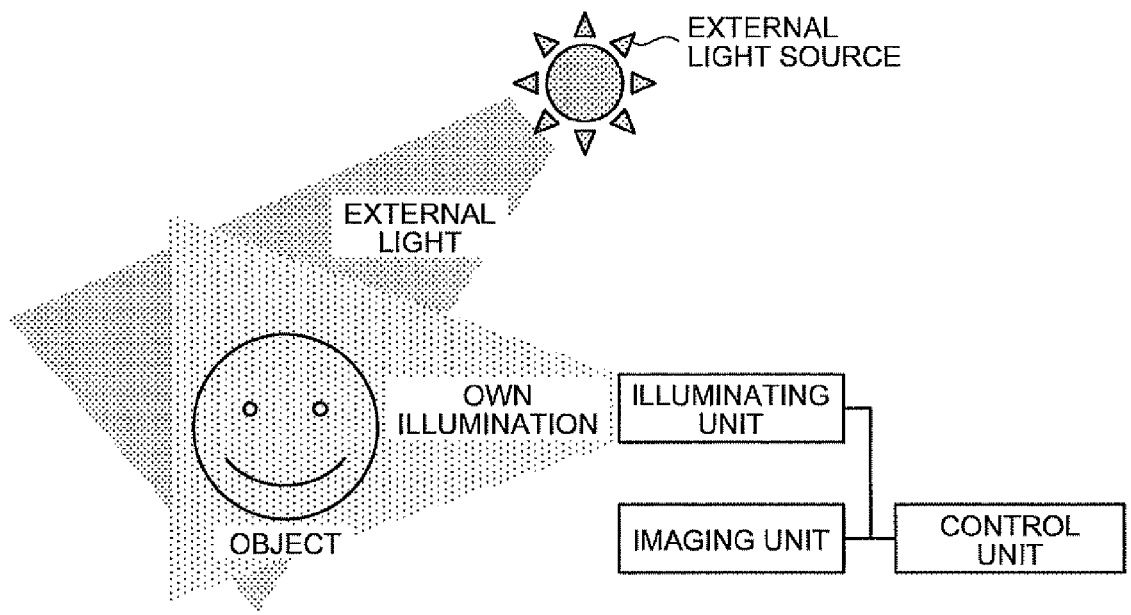
FIG. 15 is a schematic for explaining a conventional technology.

In the second embodiment, a singular illumination is used as the light source to photograph images. However, the present invention is not limited to this, and a plurality of light sources for its own illumination may also be used. With reference to FIGS. 13 and 14, an outline and a configuration of an imaging apparatus according to a third embodiment will be described. FIG. 13 is a schematic of the specific appearance of an optical system constituting unit of the imaging apparatus according to the third embodiment. FIG. 14 is a schematic of a circuit system constituting unit of the imaging apparatus according to the third embodiment.

As shown in FIG. 13, the optical system constituting unit of the imaging apparatus according to the third embodiment has a configuration basically the same as that of the optical system constituting unit of the imaging apparatus 20 according to the second embodiment. However, the optical system constituting unit of the imaging apparatus according to the third embodiment differs from the optical system constituting unit of the imaging apparatus 20 according to the second embodiment, in the point of including a plurality of LEDs for its own illumination (LED 1 and LED 2), and wavelength filters (a wavelength filter 1 corresponding to the LED 1 and a wavelength filter 2 corresponding to the LED 2) to process the ambient light introduced from the ambient light source, so as to have the same wavelength as that of the illumination light emitted from each of the LEDs for its own illumination.

As shown in FIG. 14, the circuit system constituting unit of the imaging apparatus according to the third embodiment has a configuration basically the same as that of the circuit system constituting unit of the imaging apparatus 20 according to the second embodiment. However, the circuit system constituting unit of the imaging apparatus according to the third embodiment differs from the circuit system constituting unit of the imaging apparatus 20 according to the second embodiment, in the point of including a plurality of LED drive circuits 21c in correlation with the LEDs for its own illumination.

As shown in FIG. 14, the photographing processing unit 22 of the imaging apparatus according to the third embodiment differs from the imaging apparatus 20 according to the second embodiment, in the point of outputting a plurality of imaging synchronization signals (S1 and S2) to the illumination processing unit 21. The imaging synchronization signal S1 is a synchronization signal that uses the illumination light emitted from the LED 1 for photographing. The imaging synchronization signal S2 is a synchronization signal that uses the illumination light emitted from the LED 2 for photographing.

A processing corresponding to the imaging synchronization signals will be described in detail. In other words, the illumination processing unit 21 that received an imaging synchronization signal S1 from the photographing processing unit 22 generates an LED drive signal (L_1) for turning on the LED 1, in the LED drive circuit 21c. The LED drive circuit 21c then outputs the generated LED drive signal (L_1) to the LED 1, and turns on the LED 1. The illumination processing unit 21 generates a shutter drive signal (C_1) to open shutters 1, in the shutter drive circuit 21b. The shutter drive circuit 21b then outputs the generated shutter drive signal (C_1) to the shutters 1, and opens the shutters 1.

The illumination processing unit 21 that received an imaging synchronization signal S2 from the photographing processing unit 22 generates an LED drive signal (L_2) to turn on the LED 2, in the LED drive circuit 21c. The LED drive circuit 21c then outputs the generated LED drive signal (L_2) to the LED 2, and turns on the LED 2. The illumination processing unit 21 generates a shutter drive signal (C_2) to open shutters 2, in the shutter drive circuit 21b. The shutter drive circuit 21b then outputs the generated shutter drive signal (C_2) to the shutters 2, and opens the shutters 2.

The photographing processing unit 22 photographs and obtains an image of the object 2 while being irradiated and while not being irradiated, by photographing performed in correlation with the illumination processing unit 21. This is enabled by outputting the imaging synchronization signals (S1 and S2) that synchronize the irradiation of illumination with the timing of imaging, using either of the light sources (LED 1 and LED 2), to the illumination processing unit 21. After obtaining the images, the photographing processing unit 22 obtains an image (irradiated image) in which the object 2 is irradiated only with illumination light, by taking a difference (difference of image brightness) between an irradiated image of the object 2 photographed while being irradiated, and a non-irradiated image of the object 2 photographed while not being irradiated.

In this manner, even if a plurality of light sources are used for its own illumination, the ambient light introduced from the sun, indoor lighting, and the like, can be used by processing into the light that has the same characteristics (such as wavelength) as those of the illumination light emitted from each of the light sources (such as LED 1 and LED 2) for its own illumination. Accordingly, for example, it is possible to obtain an optimum image from which the influence of ambient light is eliminated, to be used to determine the original from the imitation, of the bills, the securities, and the like.

Fourth Embodiment

The first embodiment to the third embodiment of the present invention have been described. However, it is to be understood that various other modifications may be made, other than the embodiments of the present invention. The other embodiments included in the present invention will now be described.

[Configuration of Apparatus and the Like]

The respective constituents of the circuit system constituting unit of the illumination controller 10 according to the first embodiment (see FIG. 4), and the imaging apparatus 20 according to the second embodiment or the third embodiment (see FIG. 10, and the like) are functionally conceptual, and need not necessarily be physically configured as illustrated. In other words, the specific mode of dispersion and integration of the illumination controller 10 and the imaging apparatus 20 is not limited to the ones shown in the drawings, and all or a part thereof can be functionally or physically dispersed or integrated in an optional unit, depending on various kinds of load and the status of use, by integrating the control unit 11 of the illumination controller 10 with the shutter drive circuit 13 and the LED drive circuit, or by integrating the illumination processing unit 21 that forms the imaging apparatus 20 with the shutter drive circuit 21b and the LED drive circuit 21c.

With the present invention, the ambient light introduced, for example, from the sun and/or indoor lighting can be processed to the light that has the same characteristics (such as wavelength) as those of the illumination light emitted from an illumination device controlled by itself, and emitted as illumination that has the same illumination angle and illumination distribution therewith. Accordingly, it is possible to use the illumination as its own illumination. Even in the photographing environment with strong ambient light, such as bright outdoors, it is possible to naturally strengthen the illumination intensity based on the intensity of ambient light.

With the present invention, for example, if in an environment where the intensity of ambient light is weak, it is possible to suitably strengthen its own illumination by the illumination light, and emit the light.

With the present invention, it is possible to suitably process the wavelength of the introduced ambient light, which is the main characteristic to serve as illumination. Accordingly, it is possible to use the illumination as its own illumination.

With the present invention, it is possible to suitably process the introduced ambient light with a simple configuration.

With the present invention, it is possible to introduce ambient light with a simple configuration.

With the present invention, for example, with the ambient light that has a wide wavelength distribution, such as visible light, the balance of wavelengths can be adjusted by controlling the light amount of each of the wavelength components, such as RGB. Accordingly, it is possible to process the ambient light so as to have the same wavelength distribution as that of its own illumination.

With the present invention, it is possible to control the light amount of the introduced ambient light, with a simple configuration.

With the present invention, it is possible to save the power required to turn on the illumination light, while providing sufficient illumination intensity.

With the present invention, it is possible to process the ambient light introduced from, for example, the sun and/or indoor lighting, to the light that has the same characteristics (such as wavelength) as those of the illumination light emitted from the illumination device controlled by itself. Accordingly, it is possible to obtain an optimum image from which the influence of ambient light is eliminated, for example, to be used for biometric authentication and monitoring. Even in the photographing environment with strong ambient light, such as bright outdoors, it is possible to naturally strengthen the illumination strength based on the strength of ambient light. Subsequently, it is possible to obtain an optimum image, for example, to be used for biometric authentication and monitoring, regardless of environment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An illumination controller for controlling an illumination device that irradiates an object to be photographed with illumination light, the illumination controller comprising:
   an introducing unit that introduces ambient light emitted to the object from a light source other than the illumination device;
   a processing unit that processes the ambient light introduced by the introducing unit to have a same characteristic as that of the illumination light; and
   an irradiation controlling unit that controls the ambient light processed by the processing unit so as to irradiate the object therewith as illumination, from a same path as the irradiation path of the illumination light.

2. The illumination controller according to claim 1, wherein the irradiation controlling unit combines the ambient light processed by the processing unit with the illumination light, and controls the combined light so as to irradiate the object therewith as illumination.

3. The illumination controller according to claim 1, wherein the processing unit processes a wavelength of the ambient light introduced by the introducing unit to be a same as the wavelength of the illumination light.

4. The illumination controller according to claim 1, wherein the processing unit processes a wavelength of the ambient light introduced by the introducing unit to be a same as the wavelength of the illumination light, by using a wavelength filter.

5. The illumination controller according to claim 1, wherein the introducing unit introduces the ambient light by using one or more of light guides, mirrors, optical fibers, and prisms.

6. The illumination controller according to claim 1, wherein the processing unit limits a light amount of each wavelength component that forms the ambient light introduced by the introducing unit.

7. The illumination controller according to claim 6, wherein the processing unit controls a light amount of the ambient light introduced by the introducing unit, by using a liquid crystal shutter or a piezoelectric mirror.

8. The illumination controller according to claim 2, wherein the irradiation controlling unit adjusts intensity of the illumination light based on intensity of the ambient light introduced by the introducing unit, combines the ambient light processed by the processing unit with the illumination light, and controls the combined light so as to irradiate the object therewith as illumination.

9. A method of controlling an illumination device that irradiates an object to be photographed with illumination light, the method comprising:
   introducing ambient light emitted to the object from a light source other than the illumination device;
   processing the ambient light introduced by the introducing of the ambient light to have a same characteristic as that of the illumination light; and
   controlling the ambient light processed by the processing of the ambient light so as to irradiate the object therewith as illumination, from a same path as the irradiation path of the illumination light.

10. The method according to claim 9, wherein the controlling the ambient light combines the ambient light processed by the processing the ambient light with the illumination light, and controls the combined light so as to irradiate the object therewith as illumination.

11. An imaging apparatus for irradiating an object with illumination light from an illumination device in order to photograph an image of the object, the imaging apparatus comprising:
   an introducing unit that introduces ambient light emitted to the object from a light source other than the illumination device;
   a processing unit that processes the ambient light introduced by the introducing unit to have a same characteristic as that of the illumination light;
   an irradiation controlling unit that controls the ambient light processed by the processing unit so as to irradiate the object therewith as illumination, from a same path as the irradiation path of the illumination light; and
   an image acquiring unit for acquiring an image photographed by the irradiation controlling unit while the illumination light is irradiated.

12. The imaging apparatus according to claim 11, wherein
   the irradiation controlling unit controls irradiation and non-irradiation of illumination, by synchronizing with a timing of photographing an image of the object, and
   the image acquiring unit acquires an image of the object irradiated only with illumination, by taking a difference between an image photographed while being irradiated by the irradiation controlling unit, and an image photographed while not being irradiated by the irradiation controlling unit.

13. The imaging apparatus according to claim 11, wherein the irradiation controlling unit combines the ambient light processed by the processing unit with the illumination light, and controls the combined light so as to irradiate the object therewith as illumination.

14. The imaging apparatus according to claim 11, wherein the processing unit processes a wavelength of the ambient light introduced by the introducing unit to be a same as the wavelength of the illumination light.

15. The imaging apparatus according to claim 14, wherein the processing unit processes a wavelength of the ambient light introduced by the introducing unit to be a same as the wavelength of the illumination light, by using a wavelength filter.

16. The imaging apparatus according to claim 11, wherein the introducing unit introduces the ambient light by using one or more of light guides, mirrors, optical fibers, and prisms.

17. The imaging apparatus according to claim 11, wherein the processing unit limits a light amount of each wavelength component that forms the ambient light introduced by the introducing unit.

18. The imaging apparatus according to claim 17, wherein the processing unit controls a light amount of the ambient light introduced by the introducing unit, by using a liquid crystal shutter or a piezoelectric mirror.

19. The imaging apparatus according to claim 13, wherein the irradiation controlling unit adjusts intensity of the illumination light based on intensity of the ambient light introduced by the introducing unit, combines the ambient light processed by the processing unit with the illumination light, and controls the combined light so as to irradiate the object therewith as illumination.

20. The imaging apparatus according to claim 11, wherein the irradiation controlling unit controls irradiation or non-irradiation of illumination, by using a liquid crystal shutter or a piezoelectric mirror.

* * * * *